United States Patent [19]

Tittman

[11] 3,864,569
[45] Feb. 4, 1975

[54] WELL LOGGING PROCESSING METHOD AND APPARATUS

[75] Inventor: Jay Tittman, Danbury, Conn.

[73] Assignee: Schlumberger Technology Corporation, New York, N.Y.

[22] Filed: Apr. 13, 1973

[21] Appl. No.: 351,060

Related U.S. Application Data

[60] Continuation of Ser. No. 32,504, April 14, 1970, abandoned, which is a division of Ser. No. 654,414, July 19, 1967, Pat. No. 3,521,063.

[52] U.S. Cl. ............................. 250/264, 250/269
[51] Int. Cl. .......................................... G01t 1/16
[58] Field of Search .......... 250/265, 266, 268, 269, 250/270, 267, 264

[56] References Cited
UNITED STATES PATENTS 3,202,822   8/1965   Kehler ............................... 250/266
3,263,082   7/1966   Caldwell ........................... 250/267

Primary Examiner—James W. Lawrence
Assistant Examiner—Davis A. Willis

[57] ABSTRACT

A specific embodiment of the invention identifies the chemical composition of an earth formation and compensates for mudcake during well logging. The formation is irradiated with photons that have energies less than about 1 mev. A low energy gamma radiation detector is positioned close to the gamma radiation source primarily to measure borehole parameters, while a second low energy gamma radiation detector, spaced more distantly from the gamma ray source, measures borehole characteristics and the mineral composition of the formation. The signals from the detectors are normalized and combined to produce an output that identifies formation lithology and effective mudcake thickness.

23 Claims, 2 Drawing Figures

WELL LOGGING PROCESSING METHOD AND APPARATUS

This application is a continuation of application Ser. No. 32,504, filed Apr. 14, 1070, now abandoned, which is a divisional of application Ser. No. 654,414 filed July 19, 1967 now Pat. No. 3,521,063, issued July 21, 1970.

BACKGROUND OF THE INVENTION

1. Field of the Invention

This invention relates to well logging methods and apparatus, and more particularly, to nuclear techniques for identifying the structure of the earth formations traversed by a borehole.

2. Description of the Prior Art

A tool, or sonde, for transport through a borehole, that detects photons, or gamma rays, that have been emitted from a source in the tool and scattered back from the formation measures the density of the earth formations surrounding the borehole, if the detected gamma rays have energies from about 100,000 electron volts (100 keV) to 1 million electron volts (1 MeV). The attentuation mechanism for gamma rays with energies less than about 100 keV, however, can provide some indication of the chemical composition of the formation. Chemical or mineral composition information becomes available because these low energy photons are absorbed through the photoelectric effect.

By way of background, photoelectric absorption occurs when a photon is absorbed by knocking an electron out of an orbital path about an atom in the formation structure. This phenomenon is limited to those photons that have energies that are greater than or equal to the energy that binds the electron to the nucleus. These binding energies are different for each element, and also are different for each orbital path, as the paths are separated from the nucleus by different radial distances. Accordingly, as the electrical charge on the nucleus increases (as indicated by the symbol Z for the atomic number of each element), the oppositely charged electrons occupying the innermost orbit, or the "K-shell," become more tightly bound to their respective orbits.

Thus, in a formation irradiated by gamma rays the elements of higher atomic number tend to absorb the high energy photons and thereby deplete the number of photons available at lower energies for interaction with the low Z formation constituents. Consequently, K-edge absorption by the high Z materials was believed to conceal the presence of the lighter elements. This opinion seemed to be correct because the gamma radiation spectrum resulting from the diffusion and attenuation in the formation of rays emitted by a source was dominated by K-edge absorption in the heavy elements. Spectra of this sort apparently failed to exhibit a similar absorption characteristic at lower energies with sufficient clarity to indicate the presence of the lighter elements.

The minerals and fluids of interest in oil production are coomprised largely of elements that have low atomic numbers, for example, carbon ($Z=6$), oxygen ($Z=8$), silicon ($Z=14$) and calcium ($Z=20$). j Consequently, the weighted average, or effective atomic number ($Z_{eff}$) of most of the interesting formations will be substantially less than the atomic number of the driller mud that is used to lubricate the drill bit and control the borehole pressure. Typically, barium ($Z=56$) often is used in drilling mud of this sort.

A layer of solid matter, or mudcake, usually forms on borehole walls when the fluids in the drilling mud seep into the formation. This mudcake frequently contains significant quantities of barium. K-edge absorption in the barium so disturbs the spectrum of the low energy photons that are scattered back to the tool through the mudcake, that a low Z formation covered by barium mudcake cannot be distinguished from a higher Z formation free of barium mudcake. Consequently, low energy photon measurements appeared to identify the borehole mudcake and produce almost no information about the mineral composition of the formation.

Nevertheless, a need remains for a precise and reliable technique for identifying the mineral composition of an earth formation.

Consequently, it is an object of the invention to satisfy the foregoing need, and to provide a technique that can identify materials of low effective atomic number in the presence of elements of high atomic number of measurements of low energy gamma ray spectra.

It is still another object of the invention to overcome the influence of the barite mudcake on the portion of a photoelectric gamma ray spectrum that distinguishes the mineral composition of a formation.

SUMMARY

According to one embodiment of the invention, the mudcake influence is corrected, or overcome, by measuring a low energy photon spectrum that is limited largely to those photons that are indicative of the mudcake characteristics. Anothe measurement is made that includes gamma ray information from the mudcake and the formation. These measurements are combined and produce an indication of the mineral composition of the formation under investigation, and characteristics of the mudcake clinging thereto.

More specifically, a tool is biased against the borehole wall. The tool contains a gamma radiation source. A first gamma ray detector is spaced close to the source and adjacent to the borehole wall. A special window, transparent to gamma rays having energies less than 100 keV, is secured in an aperture in the tool housing between the detector and the formation. This window enables the detector to register photons that generally have been shunted from the source through the mudcake to the detector.

A second detector is spaced from the source a substantially greater distance than the first detector. A low energy gamma ray window also is provided for this second detector. The second detector, however, observes a spectrum of photons that have been scattered through the mudcake and a substantial portion of the formation. A computer may be used to normalize the signals from the first and second detectors to remove the effect of formation denstiy on the spectrum. These normalized signals may then be combined to produce output signals that correspond to a characterizing parameter of the mudcake and the average atomic number of the formation.

The novel features of the present invention are set forth with particularity in the appended claims. The present invention, both as to its organization and manner of operation, together with further objects and advantages thereof, may best be understood by reference

DESCRIPTION OF THE PREFERRED EMBODIMENTS

Figure 1:
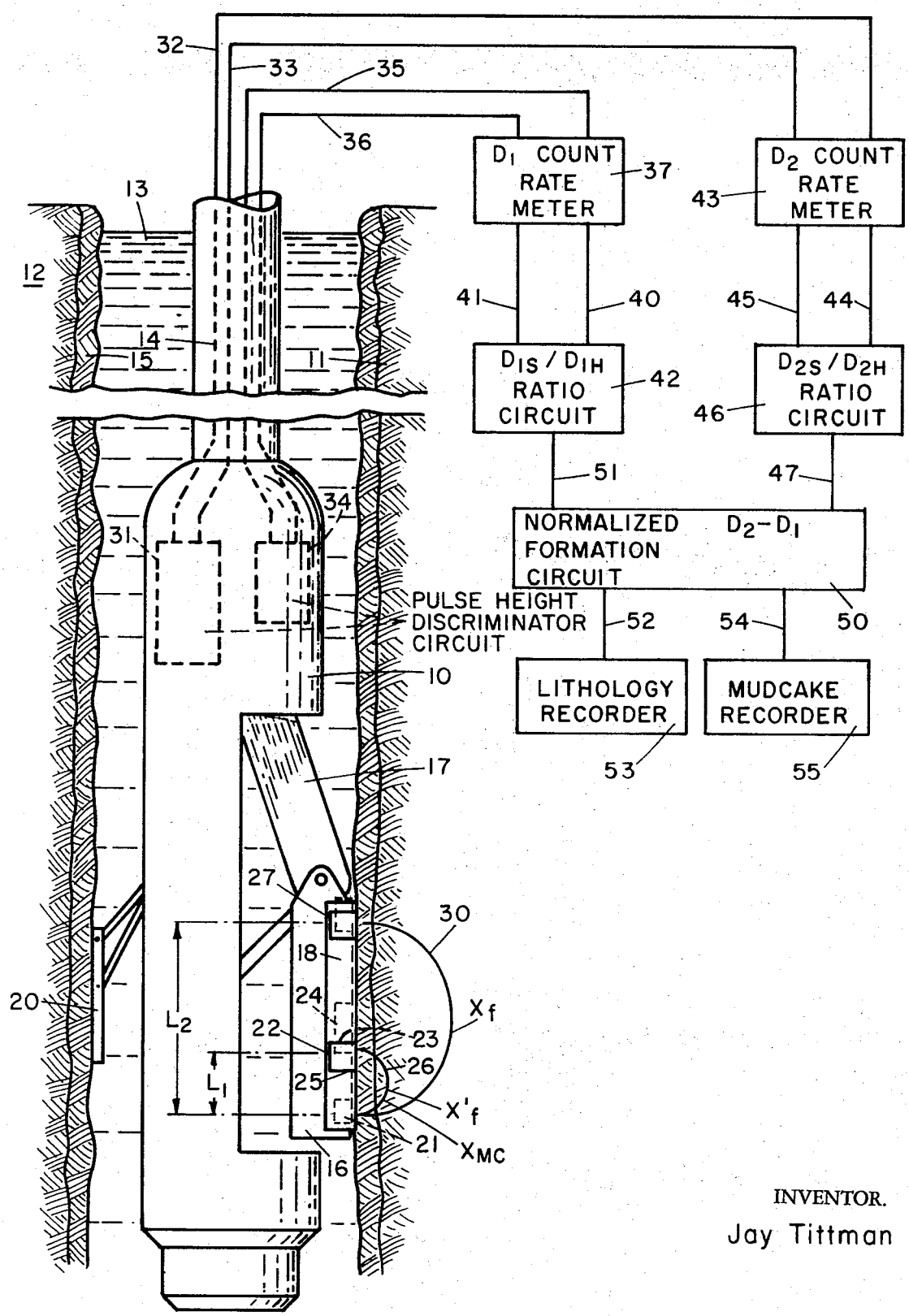
FIG. 1 is a schematic digram of an embodiment of the device for practising the invention, showing the electrical circuits associated therewith in block diagram form.

The tool (FIG. 1) comprises a fluid-tight pressure resistant housing 10 adapted to pass through a borehole 11 that traverses earth formations 12. The borehole 11 may be dry or may be filled with drilled mud 13, as shown. Housing 10 is suspended in the borehole 11 by an armored cable 14 which may contain a group of insulated conductors for transmitting signals to the earth's surface. A winch (not shown) located at the surface of the earth is used to lower and raise the housing in the borehole in the customary manner to traverse the earth formations 12.

Borehole 11 may be lined with a tenacious layer of barite mudcake 15, if a compound such as barium sulfate is used in the drilling mud 13. Because the mudcake 15 is a layer of material that essentially is unrelated to the composition of the formation under consideration, the mudcake 15 thereby introduces a factor that must be considered in the measurements to be described subsequently.

To reduce the influence of borehole variations on the gamma radiation measurements, a pad 16 is biased against the mudcake 15 and the adjoining portion of the borehole 11 by means of a decentralizing linkage 17. A skid 18, attached by rivets or the like to the pad 16 is interposed between the pad and the mudcake 15. The linkage 17 is controlled from the earth's surface and selectively extends the pad 16 outwardly from the housing 10 to place the pad 16 in substantially parallel relation with the adjacent wall of the borehole 11. The pad 16 and skid 18 are urged against mudcake 15 and the borehole 11 by a biased backup pad 20 that is pivotally connected to a portion of the housing 10 diametrically opposite to the pad 16.

The pad 16 contains a gamma ray source 21 which may be a cesium 137 ($Cs^{137}$) source of one and one-half curies strength. Gamma rays emitted from this source have an energy of about 660 KEV. Gamma rays emitted by the source 21 diffuse through the adjacent portion of the mudcake 15 and the formation 12. The energy of each photon is degraded by collisions with electrons in the atomic structure of the formation 12. As a consequence of these collisions, gamma rays of lesser energies than those which were emitted by the source 21 diffuse back toward the pad 16. The intensities of these multiply-scattered gamma rays as a function of energy below about 300 keV establishes a spectral curve that identifies the mineral composition of the formation to the extent of determining its average atomic number, as described subsequently.

The gamma ray spectrum is registered by a gamma ray detector 22. The detector 22 may be, for example, a semiconductor detector or a scintillation crystal 23, optically coupled to a light responsive channel electron multiplier or photomultiplier tube 24. Gamma rays incident upon the crystal 23 produce flashes of light within the crystal that are transmitted to the photomultiplier tube 24. The tube 24 converts each flash of light into an electrical charge pulse that is proportional to the luminant intensity of the light flash and, hence, proportional to the energy deposited in the scintillator by the incident gamma ray.

The pad 16 and the skid 18 ordinarily are made of steel or some other durable material. The high atomic number of tough metals such as iron ($Z=26$) or tungsten ($Z=74$) seriously attenuates low energy gamma rays. This helps prevent gamma rays from finding their way to the far detector through mud or mudcake. The photon intensity spectrum which it is desired to detect is preserved from absorption by the pad and skid materials through a low energy gamma ray window 25. The window 25 is secured in liquid and pressure-tight relation with apertures formed in the pad 16 and the skid 18 that are in alignment with the scintillation crystal 23. The window 25 is fashioned of beryllium or some other low atomic number element or composition that is substantially transparent to gamma rays that have energies less than 300 keV.

In order to enable the gamma ray detector 22 to measure mudcake characteristics, the detector is spaced close to the gamma radiation source 21 and is separated therefrom by the distance $L_1$. Illustratively, mean path 26 for gamma radiation reaching the detector 22 from the source 21 traverses a relatively greater distance through the mudcake 15 than through the formation 12.

A second detector 27, which may be similar in construction to the detector 22 and provided with an appropriate low energy gamma ray window in the pad 16 and the skid 18, is spaced axially from the source 21 a distance $L_2$ such that $L_2 >> L_1$. Gamma radiation shielding material (not shown) is placed in the pad 16 between the detectors 22 and 27 and the source 21 to protect the detectors from direct radiation from the source. The distance $L_2$ may be long enough to enable the multiply-scattered photon spectrum to reach an equilibrium condition in which the overall profile of the spectrum remains relatively constant at successively increasing distances from the source 21. The separation $L_2$, moreover, must not be so great that detector counting statistics suffer and introduce a degree of unreliability in the measured data. Optimum $L_1$ and $L_2$ spacings for different formation, detector and source strength combinations can be developed through field experience or experiments performed in test formations.

Illustratively, the distances $L_1$ and $L_2$, moreover, as shown in FIG. 1, are measured between the geometric centers of the source and the detectors. Alternatively, distances between the effective centers, or any other suitable reference points can be used to provide the source to detector spacing measurement.

Because mean path 30 for the photons registered by the detector 27 traverses a substantial portion of the earth formation 12 as well as the mudcake 15, the photon spectrum measured by the detector 27 bears formation and mudcake information. Thus, the counting rate (CPS) of the detector 27 is of the form:

$$CPS \sim e^{-\mu \rho x} \qquad (1)$$

where $\mu$ is an appropriate means absorption coefficient for the mean path 30; $\rho$ is the mean density of the mudcake 15 and the formation 12; and $x$ is the length of the mean path 30 from source 21 to the detector 27 through the medium adjacent the pad 16.

Equation (1), however, is composed of the following approximate factors:

$$CPS \sim e^{-(\mu\rho)_{mc} x_{mc}} \cdot e^{-(\mu\rho)_f x_f} \cdot e^{-(\mu\rho)_{mc} x_{mc}} \quad (2)$$

where $x_{mc}$ is a diagonal distance across the mudcake 15, the subscript mc refers to the mudcake, and the subscript $f$ refers to the formation. Collecting terms in equation (3):

$$CPS \sim e^{-2(\mu\rho)_{mc} x_{mc}} \cdot e^{-(\mu\rho)_f x_f} \quad (3)$$

for the detector 27.

The same analysis applies to the counting rate of the detector 22.

It has been established that $(\mu\rho)_{mc}$ is much larger than $(\mu 92)_f$ because of the aforementioned low energy photon absorption characteristics of the barite mudcake 15. Consequently, the mudcake identification component of the signal from the detector 22 often overwhelms that portion of the detector signal that characterizes the formation 12 because $$(\mu\rho)_{mc} x_{mc} \gg (\mu\rho)_f x'_f \quad (4)$$

where $x'_f$ is that portion of the mean path 26 that traverses the formation 12.

The distance from source 21 to detector 27 is chosen explicitly such that gamma rays reaching detector 27 traverse a distance $x_f$ through the formation 12 which permits the condition $$(\mu\rho)_f x_f \gtrsim (\mu\rho)_{mc} x_{mc}$$

to be satisfied.

Thus, the invention permits $(\mu\rho)_f$, which largely is a function of the effective atomic number of the formation ($Z_{eff}$), to be measured by the detector 27. Measuring $(\mu\rho)_{mc}$ with the detector 22, enables a mudcake correction to be applied to the signal from the detector 27 and also produces an indication of mudcake characteristics, as subsequently described in more complete detail. Accordingly, the mudcake and formation dependent components of the signal from the detector 27 are more balanced and distinguishable, and thereby identify the chemical composition of the formation more readily. Consequently, the detector 22 is primarily sensitive to mudcake and the detector 27 is sensitive to the mudcake and the formation. Source detector separations $L_1$ and $L_2$ are selected, then, on the basis of source, detector, formation and mudcake characteristics, counting statistics and field experience to provide maximum accuracy in the determination of the formation atomic number.

In one embodiment of the invention, the chemical composition of the formation and the characteristics of the mudcake 15 are identified through the circuits shown in FIG. 1. The signal from the detector 27 $i$ sent to a two-channel pulse height analyzer circuit 31. The analyzer circuit 31 transmits signals that correspond to "soft" photon intensities (energies less than about 120 keV) from the detector 27 through conductor 32 in the armored cable 14 to the earth's surface. "Hard" gamma radiation signals (photon energies greater than about 120 keV) are sent by the analyzer circuit 31 from the detector 27 to the earth's surface through conductor 33. The predetermined energy level of 120 KEV is substantially less than the energy of the cesium 137 source.

In a similar manner, a pulse height analyzer circuit 34 transmits soft gamma radiation signals from the detector 22 to the earth's surface through a conductor 35. Hard gamma radiation signals from the detector 22 are sent through conductor 36 in the armored cable 14 also to the earth's surface.

The hard and soft gamma radiation signals in conductors 35 and 36 from the mudcake detector 22 are received by circuit $D_1$, a two-channel count rate meter 37 that converts the detector signals into time-dependent soft ($D_{1s}$) and hard ($D_{1h}$) counting rate signals in conductors 40 and 41, respectively.

These counting rate signals are "normalized" to eliminate the influence of the formation and mudcake density on the detected photon intensity spectrum by striking a ratio of the soft-to-hard counting rate signals in a ratio circuit 42.

Similarly, soft and hard gamma radiation signals in conductors 32 and 33 from the detector 27 are transmitted to a circuit $D_2$, a two-channel count rate meter 43. The meter 43 produces signals in conductors 44 and 45 that correspond to soft and hard counting rates $D_{2s}$ and $D_{2h}$, respectively. The spectrum of gamma ray intensities registered by the detector 27 also is normalized in order to eliminate formation and mudcake density effects by striking a ratio between the $D_{2s}$ and $D_{2h}$ signals in ratio circuit 46.

The normalized signal from ratio circuit 46 is sent through a conductor 47 to a circuit 50 to be combined with the signal from the ratio circuit 42 in conductor 51. The circuit 50 produces two signals that characterize the formation 12 and the mudcake 15, respectively. Circuit 50 preferably may be a function former circuit that takes the form of an operational amplifier having a resistor-diode network connnected into the feedback circuit thereof. The circuit parameters and biasing for the circuit 50 are selected to establish the correct relationship between the input ratio signals in accorance with the representative graph shown in FIG. 2.

Figure 2:
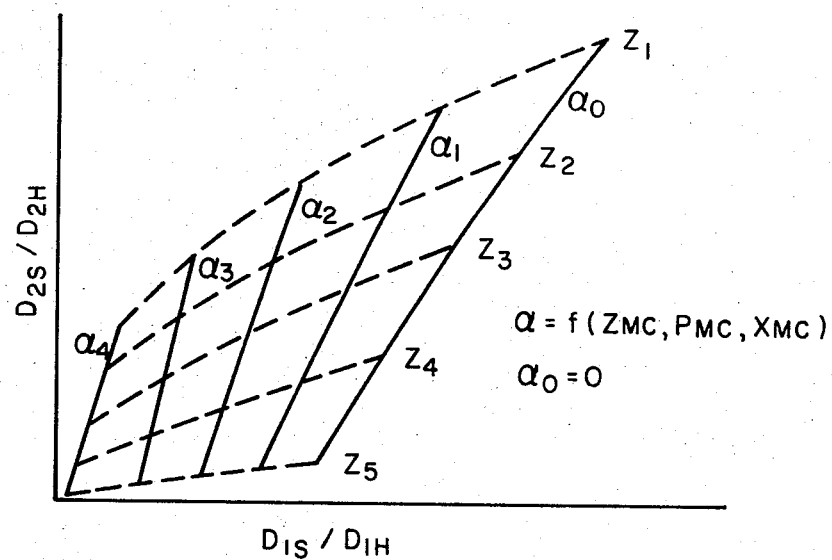
FIG. 2 is a representative graph illustrating the method of combining the observed low energy gamma ray data.

Thus, the abscissa of the graph in FIG. 2 corresponds to the normalized signal from the detector 22, and the normalized signal from the detector 27 provides an entry argument for the ordinate of the graph. The circuit 50 identifies the average atomic number Z of the formation and a mudcake characterizing parameter which is essentially a function of $Z_{mc}$, $\rho_{mc}$ and $x_{mc}$ in accordance with specific values for the ratios $D_{1s}/D_{1h}$ and $D_{2s}/D_{2h}$.

The graph in FIG. 2 is arranged so that atomic numbers $Z_1$ to $Z_5$ encompass a range of values from the lowest to the highest effective atomic numbers displayed on the graph, respectively. The value of $\alpha$, the mudcake characterizing parameter, decreases progressively with increasing strength in the $D_{1s}/D_{1h}$ signal.

Turning again to FIG. 1, the formation circuit 50 produces an output signal in conductor 52 that corresponds to the effective atomic number, $Z_{eff}$, that identifies the mineral composition of the formation 12. The effective atomic number signal conveniently may be recorded in a lithology recorded 53 that produces a trace of $Z_{eff}$ as a function of borehole depth. Signals corresponding to the value of $\alpha$ are transmitted through a conductor 54 to a mudcake recorder 55 which also may produce a permanent record of $\alpha$ as a function of borehole depth. When mudcake density, $\rho_{mc}$, and atomic number $Z_{mc}$, are known, the mudcake thickness can be computed accurately.

While particular embodiments of the present invention have been shown and described, it is apparent that changes and modifications may be made without departing from this invention in its broader aspects, and, therefore, the aim in the appended claims is to cover all such changes and modifications as fall within the true spirit and scope of the invention.

What is claimed is:

1. A computer for identifying earth formation characteristics, comprising means for producing a first and a second signal corresponding to an energy spectrum of a plurality of photon intensities, said first signal corresponding to photon intensities in an energy spectrum below a predetermined energy level and the second signal corresponding to photon intensities in an energy spectrum greater than a predetermined energy level, means for normalizing said first and second signals, means for producing third and fourth signals that correspond to an energy spectrum of a plurality of photon intensities, said third signal corresponding to the photon intensities in an energy spectrum below a predetermined energy level and said fourth signal corresponding to photon intensities in an energy spectrum greater than a predetermined energy level, means for normalizing said third and fourth signals and means for combining said normalized signals to produce at least one signal that identifies earth formation characteristics.

2. A computer, according to claim 1, wherein said first and third signals represent soft gamma radiation and said second and fourth signals represent hard gamma radiation and wherein said first and second signals and third and fourth signals are normalized by taking the ratio of the soft gamma ray signal to the hard gamma ray signal.

3. A method of processing well logging signals comprising producing first and second signals corresponding to an energy spectrum of a plurality of photon intensities, said first signal corresponding to photon intensities in an energy spectrum below a predetermined energy level and the second signal corresponding to photon intensities in an energy spectrum greater than a predetermined energy level, normalizing said first and second signals, producing third and fourth signals that correspond to an energy spectrum of a plurality of photon intensities, said third signal corresponding to photon intensities in an energy spectrum less than a predetermined energy level and the fourth signal corresponding to photon intensities in an energy spectrum greater than a predetermined energy level, normalizing said third and fourth signals and combining said normalized signals to produce at least one signal that identifies earth formation characteristics.

4. The method of claim 3 wherein said first and second signals are normalized by taking the ratio of the first signal to the second signal and the third and fourth signals are normalized by taking the ratio of the third signal to the fourth signal.

5. The method of claim 4 wherein said first and third signals represent soft gamma radiation signals and said second and fourth signals represent hard gamma radiation signals.

6. Apparatus for identifying earth formation characteristics from at least one signal produced in response to radiation emitted into an earth formation from a source of gamma radiation, comprising:
   a. means for separating said at least one signal into second and third signals, said second signal corresponding to photon intensities in an energy spectrum that is an energy range below a predetermined energy level, said third signal corresponding to photon intensities in an energy spectrum that is in an energy range beginning at and extending above said predetermined energy level, said predetermined energy level being substantially less than the energy level of the radiation source;
   b. means for combining said second and third signals to produce a normalized signal; and
   c. means responsive to said normalized signal for producing an output signal indicative of an earth formation characteristic.

7. The apparatus of claim 6 wherein said second and third signals are respectively soft and hard gamma radiation signals and said normalized signal is a ratio of the soft gamma radiation signal to the hard gamma radiation signal.

8. The apparatus of claim 7 wherein the source of radiation is cesium 137 and the predetermined energy level is about 120 KEV.

9. A method for identifying earth formation characteristics from at least one signal produced in response to radiation emitted into an earth formation from a source of gamma radiation, comprising:
   a. separating said at least one signal into second and third signals, said second signal corresponding to photon intensities in an energy spectrum that is in an energy range below a predetermined energy level, said third signal corresponding to photon intensities in an energy spectrum that is in an energy range beginning at and extending above said predetermined energy level, said predetermined energy level being substantially less than the energy level of the radiation source;
   b. combining said second and third signals to produce a nomalized signal; and
   c. producing in response to said normalized signal an output signal indicative of an earth formation characteristic.

10. A system for processing well logging measurements, comprising means for producing a first signal that corresponds to an energy spectrum of photon intensities derived from a first gamma radiation detector, means for producing a second signal that corresponds to an energy spectrum of photon intensities derived from a second gamma radiation detector, means for producing a third signal that corresponds to an energy spectrum of photon intensities derived from said second detector and which energy spectrum is different from the other second detector derived energy spectrum, means for combining representation of said second and third signals to produce at least one output signal, and means for utilizing representations of said at least one output signal and said first signal to determine at least one subsurface parameter.

11. The system of claim 10 wherein said means for utilizing includes means for combining representations of said at least one output signal and said first signal to produce an output representation of said at least one subsurface parameter.

12. The system of claim 10 wherein said representations of second and third signals are combined in a manner to produce an output representation which is functionally related to the ratio of said second and third signals to one another.

13. The system of claim 10 wherein said at least one subsurface parameter is representative of the lithology of an earth formation adjacent said detectors.

14. The apparatus of claim 10 wherein said energy spectra for both detectors is substantially less than the initial energy of emitted radiation which causes said detectors to produce signals.

15. A system for processing well logging measurements comprising means for producing a first signal that corresponds to an energy spectrum of photon intensities derived from a first gamma radiation detector, means for producing a second signal that corresponds to an energy spectrum of photon intensities derived from said first detector and which energy spectrum is different from the other spectrum derived from said first detector, means for combining said first and second signals to produce at least one first output signal, means for producing a third signal that corresponds to an energy spectrum of photon intensities derived from a second gamma radiation detector means for producing a fourth signal that corresponds to an energy spectrum of photon intensities derived from said second detector and which energy spectrum is different from other second detector derived energy spectrum, means for combining representations of third and fourth signals to produce at least one second output signal, and means for utilizing representations of said output signals to determine at least one subsurface paramenter.

16. A method of processing well logging measurements comprising producing a first signal that corresponds to an energy spectrum of photon intensities derived from a first gamma radiation detector, producing a second signal that corresponds to an energy spectrum of photon intensities derived from a second gamma radiation detector, producing a third signal that corresponds to an energy spectrum of photon intensities derived from said second detector and which energy spectrum is different from the other second detector derived energy spectrum, combining representations of second and third signals to produce at least one output signal, and utilizing representations of said at least one output signal and said first signal to determine at least one subsurface parameter.

17. The system of claim 16 wherein said step of utilizing includes combining representations of said at least one output signal and said first signal to produce an output representation of said at least one subsurface parameter.

18. The system of claim 16 wherein said representations of second and third signals are combined in a manner to produce an output representation which is functionally related to the ratio of said second and third signals to one another.

19. The method of claim 16 wherein said at least one subsurface parameter is representative of the lithology of an earth formation adjacent said detectors.

20. The method of claim 16 wherein said energy spectra for both detectors is substantially less than the initial energy of emitted radiation which causes said detectors to produce signals.

21. The method of claim 18 wherein said at least one subsurface parameter is representative of the lithology of an earth formation adjacent said detector.

22. A method of processing well logging measurements comprising producing a first signal that corresponds to an energy spectrum of photon intensities derived from a first gamma radiation detector, producing a second signal that corresponds to an energy spectrum of photon intensities derived from said first detector and which energy spectrum is different from the other spectrum derived from said first detector, combining said first and second signals to produce at least one first output signal, producing a third signal that corresponds to an energy spectrum of photon intensities derived from a second gamma radiation detector, producing a fourth signal that corresponds to an energy spectrum of photon intensities derived from said second detector and which energy spectrum is different from the other second detector derived energy spectrum, combining representations of said third and fourth signals to produce at least one second output signal and utilizing representations of said output signals to determine at least one subsurface parameter.

23. The method of claim 22 wherein said step of utilizing includes combining representations of said at least one output signal and said first signal to produce an output representation of said at least one subsurface parameter.

* * * * *